Jan. 14, 1930. S. S. STOLP 1,743,405
ELECTRICALLY OPERATED TRACK SWITCH
Filed Aug. 6, 1928

INVENTOR.
SAMUEL S. STOLP
BY John L. Milton
ATTORNEY

Patented Jan. 14, 1930

1,743,405

UNITED STATES PATENT OFFICE

SAMUEL S. STOLP, OF LOUISVILLE, KENTUCKY, ASSIGNOR TO CHEATHAM ELECTRIC SWITCHING DEVICE CO., OF LOUISVILLE, KENTUCKY

ELECTRICALLY-OPERATED TRACK SWITCH

Application filed August 6, 1928. Serial No. 297,640.

My invention relates to electrically operated track switches operated electrically from the car.

One object of my invention is to produce a system that works "power on" or "power off" the system as hereinafter described.

This invention relates to improvements in electrically operated switch controls in which solenoids, contactors and circuits are grouped to produce the following objects:—

First, to increase the life of the apparatus; second, to increase the speed of operation; third, to introduce a time element in the switch operating circuit that will open the circuit within the operating length of the contactor; and fourth, to introduce a time element in the switch operating circuit that will limit the time of current application to the track solenoids, this being the maximum predetermined time.

These objects are attained by the apparatus illustrated in the accompanying drawings in which—

Figures 1, 2:
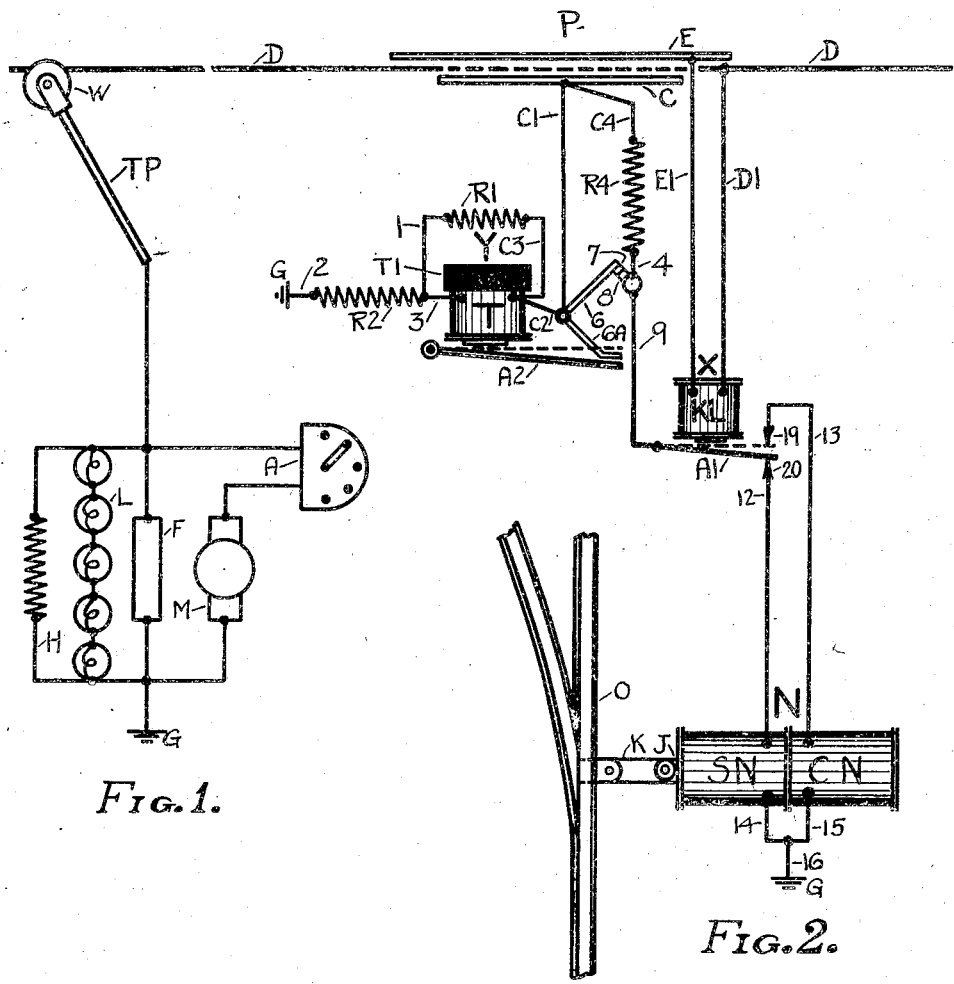
Fig. 1 is a schematic drawing showing the general arrangement of circuits usually found in an electrically operated car and which are taken account of in the operation of my invention.
Fig. 2 is a schematic drawing showing the arrangement of parts and circuits when the system is in a normal condition.

Under such circumstances, however, the switch tongue may be in either of its operable positions.

My invention is intended primarily for use with those cars which are operated by means of an overhead trolley wheel or current collector W mounted on the car by means of a trolley pole TP, although it may be operated by cars in which current is supplied thereto by other methods. Most cars are equipped with heaters H, lights L, and air compressors F, which are connected between the trolley pole and ground G. The cars are equipped with operating motors M and a controller A therefor, which is under the control of the car operator. When the controller is closed current will flow through the motors M and this position I term "power on". When the controller is open no current will flow through the motors and this position I term "power off". The controller A does not in any way control the current flowing through the apparatus H, L, and F, which I term the auxiliary car current. The current flowing through the motors flows to ground G. I have arranged the system herein described, so that the track switch will be operated to the "straight ahead" position when the collector W engages the trolley contactor P with "power off" and the track switch will be thrown to the "curved" position when the current collector engages the system using "power on". This operation of the track switch, however, may be reversed by merely transposing the connections of the track switch operating solenoids and is accepted that this change is evident to those skilled in the art.

In the system shown in Fig. 2, the letter D represents a trolley wire or conductor. Positioned adjacent the trolley conductor is a pan or trolley contactor P provided with two contact members E and C which are usually parallel and normally insulated from each other. The member E is electrically connected to the trolley conductor at all times, but the member C is normally insulated therefrom, but is electrically connected thereto when the current collector W engages the pan or trolley contactor P. The contact members E and C are so related to the trolley conductor that when the current collector engages the contact members, it will be out of engagement with the trolley conductor, and remain so until it is about to pass out of engagement with the pan or trolley contactor. Such an arrangement of the contact members and conductor is well known to those skilled in the art.

I also employ an electrically operated track switch N provided with two solenoids SN and CN, each having a connection to the ground through the common conductor 16.

The solenoids are provided with a reciprocating plunger J which is drawn inwardly when the solenoid CN is energized and is drawn outwardly when the solenoid SN is energized. The plunger J is connected to the switch tongue O by means of the connecting link K. I also employ an electrically operated normally open relay X provided with an operating coil KL and a switch arm $A^1$. The coil KL is mounted on a magnet core which is also true of the other switch coil later referred to, although a moving plunger may be substituted for the magnet core, as is well known in the art. One terminal of the coil KL is connected to the contact member E of trolley contactor P by wire $E^1$, and the other coil terminal is connected to the trolley conductor D by wire $D^1$. The switch arm $A^1$ is normally in its free state; that is, not influenced by any magnetic flux, and rests against the normally closed back contact 20, and is connected through wire 12 to solenoid SN of track switch N. When the coil KL of relay X is energized it affects its armature $A^1$ and raises it into contact engagement with contact 19 which is a front contact of relay X. Front contact 19 of relay X is connected through wire 13 to solenoid CN of track switch N.

The other relay Y that I employ has in addition to its operating coil T a copper slug $T^1$, an armature $A^2$, and a contact arm 6 carrying a contact 7. The relay Y is provided with a retarded pickup factor and this retardation may be brought about by various well known constructive principles, a copper or brass slug or sleeve about the core of the coil of the relay, as indicated by $T^1$, or it may be brought about by the spacing of the armature $A^2$ with respect to the core when in the open position or a combination of these, or a dash-pot et cetera, may be employed. In the retarded pickup relay Y the contact arm 6 that carries the contact 7, normally rests against the fixed contact 8 and has a separate bearing point from that of the armature $A^2$. It can be readily seen by reference to the drawings that the armature $A^2$, during its course of travel, will strike the contact arm extension 6A, and effect a movement of the contact arm 6 away from the contact 8 with a very quick movement. It will also be noted by reference to the dotted lines for relay Y that after the completion of this hammer blow effect the contact arm is turned to rest in mid position, being stopped during its return course of travel by the armature $A^2$. It is the purpose of this arrangement to permit the contact arm to return a portion of its travel, and come to rest before the contacts 7 and 8 close, so as to avoid any excessive or deteriorating wear on the contacts due to hammering.

It will be noted that the contact arm 6 is a common connecting point for wires $C^1$ and $C^2$, wire $C^1$ connecting the contact arm with the contact member C of trolley contactor P, and wire $C^2$ connecting contact arm 6 with one coil terminal of coil T of relay Y. The back contact 8 of relay Y is a common connecting point for wires 4 and 9, wire 4 connecting the contact with the resistance unit $R^4$, which is connected to the contact member C of trolley contactor P by wire $C^4$, and wire 9 connecting the armature $A^1$ of relay X. With reference to the relay Y of Fig. 2 it will be noted that a portion of the operating current for coil T of relay Y is shunted through the resistance unit $R^1$. This circuit being completed by the connections obtained through wires $C^3$, 1 and 3. It will also be noted that this divided flow of current has a common return through the resistance unit $R^2$, through wire 2 to ground G. The resistance unit $R^4$ that is employed has a dual function, one function is to suppress the arc broken at the contact points 7 and 8, and the other is to provide a path for the leakage current from contact member C of trolley contact P, which is almost universally constructed of wood, and under certain conditions leakage paths are established from contact member E of trolley contactor P to contact member C, thereby a continual flow of current results, not of sufficient magnitude to effect an operation of the relay Y, but merely enough to cause a probable holding of its armature $A^2$ after it has been raised to the closed position. If this condition existed, it would be seen that the contacts 7 and 8 would remain open and the switch operating circuit inoperable, however, by the insertion of the low resistance unit $R^4$, the leakage holding current for coil T of relay Y, is shunted to a point where its armature would not stick electrically under any possible contactor leakage condition. It is evident to those skilled in the art, that the switch control will operate with the resistance $R^4$ removed and the trolley contactor so constructed to eliminate the objectional leakage conditions.

It must be remembered that the switch operating solenoids CN and SN are wound with a relatively low resistance thereby a high wattage results in either of the solenoids when they are in an operating condition. Therefore, it is very desirable to have a reliable and safe time element to remove the current from these coils after they have been given enough time to perform their operation. It must also be remembered that the operating coil KL of relay X has a very low resistance; that is, it generally consists of 6 or 8 turns of No. 6 copper wire. Relay X is a current selective relay; that is, a very heavy current must pass through its operating coil KL before it can affect its armature $A^1$. This current is always greater than any current used in the operation of the control relays and track switch solenoids employed in the system. This current is always equivalent to one or two points power as may be used by the car operator, which is always greater than the auxiliary currents used by trolley cars.

In the system shown in Fig. 2, when the current collector or trolley wheel engages the trolley contactor P with "power off" the operating coil KL of relay X is not energized to the point where it would affect its armature A¹ as the current passing through the coil at this interval would only be the auxiliary currents of the car and the small currents that are employed to operate the relays and the solenoids of the system. As the current collector comes into contact engagement and bridges contact members C and E of the trolley contactor P, a circuit is established to the track switch operating solenoid SN, feeding from the trolley conductor D, through wire D¹, coil KL of relay X, wire E¹, contact member E of trolley contactor P, thru the current collector W, through the contact member C of trolley contactor P, wire C¹, contact arm 6 of relay Y, contact 7 that is carried in the contact arm 6, back contact 8 of relay Y, wire 9, armature A¹ of relay X, back contact 20 of relay X, wire 12, solenoid SN of track switch N, wire 14, wire 16 to ground G, and the track switch operating mechanism will be operated to the "straight ahead" course, or held in this position depending upon the previous condition of the track switch. Instant to the establishment of this circuit the retarded pickup relay Y is brought into action by the completion of the circuit through its operating coil T, the circuit being completed from the trolley conductor D, through wire D¹, coil KL of relay X, wire E¹, contact member E of trolley contactor P, through the current collector W, contact member C of trolley contactor P, wire C¹, wire C², coil T of relay Y, wire 3, resistance unit R², wire 2 to ground G. It will be noted that not all the current of this circuit passed through the operating coil T of relay Y as a portion of it was shunted through the resistance unit R¹, feeding from one coil terminal of coil T which is a common connecting point for wires C² and C³ through wire C³, resistance unit R¹, wire 1, resistance unit R², wire 2 to ground G. After the predetermined time interval of relay Y, the means heretofore described, the armature A² of relay Y is affected, and is raised to the closed position, wherein during its course of travel it strikes the contactor arm extension 6A of contact arm 6 and effects an opening of the contacts 7 and 8 of relay Y. The opening of these contacts opens the track switch solenoid operating circuit that was completed through them. The opening of these contacts, however, did not affect the circuit completed through the operating coil T of relay Y, as this circuit remains established as long as the current collector engages the contact members E and C of trolley contactor P, to retain the contacts 7 and 8 open as heretofore described. It will also be noted that all of the current flowing through the solenoid SN of the track switch N was not removed, but was reduced to a point where the operating solenoid of the track switch mechanism N would not be damaged by over-heating. The current in this circuit was reduced through the opening of contacts 7 and 8, and the insertion of the resistance R⁴. The insertion of the resistance R⁴ in the circuit resulted in a flow of current from the conductor D, through wire D¹, operating coil KL of relay X, wire E¹, contact member E of trolley contactor P, through the current collector W, contact member C of trolley contactor P, wire C⁴, resistance unit R⁴, wire 4, wire 9, armature A¹ of relay X, back contact 20 of relay X, wire 12, solenoid SN of track switch N, wire 14, wire 16 to ground G. It will also be noted that the insertion of the resistance unit R⁴ in the circuit enables a longer application of current to the track switch operating solenoid than was heretofore possible, by reducing it to a point where it would not damage the operating solenoids and still be of sufficient magnitude to retain a magnetic influence on the plunger of the track switch operating mechanism until the switch operating machine was completely brought to rest, thereby eliminating the possibility of rebounding, as was a very probable occurrence in the devices heretofore employed. As soon as the current collector W dis-engages the trolley contactor P the operating coil T of relay Y is deenergized, thereby permitting the contact arm 6 to be restored to its normal position and effect a closing of the contacts 7 and 8, wherein the device will be ready for a subsequent switch operation.

If the current collector engages the trolley contactor P initially using "power on" the coil KL of relay X will be energized, as a current of sufficient magnitude is passing through it, to produce an operation of its armature A¹ to the closed position bringing it into contact engagement with the normally open front contact 19 of relay X. Instant to the completion of this operation and the engagement of the current collector W with contact members E and C of the trolley contactor P, a circuit will be completed to the track switch solenoid CN of track switch N, to effect an operation of the track switch operating device to the "curved" position. The circuit being completed from the trolley conductor D through wire D¹, operating coil KL of relay X, wire E¹, contact member E of trolley contactor P, current collector W, contact member C of trolley contactor P, wire C¹, contact arm 6 of relay Y, contact 7 that is carried in contact arm 6, back contact 8 of relay Y, wire 9, armature A¹ of relay X, front contact 19 of relay X, wire 13, track switch operating solenoid CN of track switch N, wire 15, wire 16 to ground G. After a predetermined time interval the relay Y will operate in the same manner as was described for the "straight ahead" operation, and the resistance unit R⁴ will be introduced into the solenoid circuit and the same results will be obtained as heretofore described.

To sum up the operation of this system, if the car operator desires to go "straight ahead" he sets his controller to "power off" with the intention of coasting past the trolley contactor P. As soon as the current collector engages the trolley contactor P, the track switch will operate to the "straight ahead" position, and should it remain on the contactor the current for the track switch operating solenoid will be reduced to a point wherein the track switch operating solenoid will not be damaged through over-heating.

If the car operator desires to take the "curved" position, he will turn his controller to "power on" with the intention of passing the trolley contactor P drawing power. When the current collector engages the trolley contactor P with "power on", relay X will operate and select the "curved" position track switch operating solenoid, and the track switch will be thrown to the "curved" position. However, should the operator be compelled to bring his car to a stop under the trolley contactor the current of the track switch operating solenoid will be reduced and the same protection will be provided for the solenoids as was described for the "straight ahead" position. There are, of course, modifications and arrangements of the parts which may be made from that shown in the above disclosure and which will still fall within the scope of my invention.

What I claim is:

1. In a system of the class described, the combination of a power line, an actuating solenoid, a relay operable to selectively direct currents thru the different parts of the actuating solenoid, and a second retarded pickup relay for controlling the circuit of the said solenoid, a shunt path provided to reduce the operating current through the said relay, and means to reduce the current flowing in the said solenoid circuit after the said retarded pickup relay has operated.

2. In a switch operating system, the combination with a switch point of a double solenoid operating means to operate it in one direction or the other having one side of each solenoid connected to ground, a trolley wire, a trolley contactor with a pair of parallel contacts to be bridged by a current collector one contact longer than the other and arranged to make contact in advance of the other, a solenoid operating circuit from the shorter contact to the solenoids to carry current to operate the solenoids when the current collector engages the trolley contactor, a selector switch interposed in said circuit for directing the current to one solenoid or the other at will, a time limit switch in said circuit to open and interpose resistance in said circuit to reduce the current after a predetermined time of flow, a circuit connecting the other contact of the trolley contactor with the trolley and having means therein to control the selector switch, a circuit connecting the time limit switch relay and one contact of the trolley contactor to ground including a resistor in the common return, said relay provided with a shunt to permit an operation of the time limit switch when a current collector bridges the contacts of the trolley contactor, electrically controlled means to permit a positive large initial opening of the time limit switch and permit it to be restored to a position other than a closed position as long as the current collector bridges the contacts.

In testimony whereof I affix my signature.

SAMUEL S. STOLP.